(12) United States Patent  (10) Patent No.: US 8,503,109 B2
Kimura et al.  (45) Date of Patent: Aug. 6, 2013

(54) OPTICAL SYSTEM AND IMAGING DEVICE

(75) Inventors: Masayuki Kimura, Osaka (JP); Yasushi Yagi, Hyogo (JP)

(73) Assignee: Panasonic Corporation, Osaka (JP)

( * ) Notice: Subject to any disclaimer, the term of this patent is extended or adjusted under 35 U.S.C. 154(b) by 198 days.

(21) Appl. No.: 12/995,693

(22) PCT Filed: Apr. 5, 2010

(86) PCT No.: PCT/JP2010/002470
§ 371 (c)(1),
(2), (4) Date: Dec. 2, 2010

(87) PCT Pub. No.: WO2010/116705
PCT Pub. Date: Oct. 14, 2010

(65) Prior Publication Data
US 2011/0085252 A1  Apr. 14, 2011

(30) Foreign Application Priority Data
Apr. 6, 2009 (JP) .................... 2009-092406

(51) Int. Cl.
*G02B 13/06* (2006.01)
*G02B 17/00* (2006.01)
*G02B 17/08* (2006.01)

(52) U.S. Cl.
CPC .................. *G02B 13/06* (2013.01); *G02B 17/0836* (2013.01)
USPC ......................... 359/725; 359/729

(58) Field of Classification Search
CPC .............. G02B 13/06; G02B 17/0836
USPC .................................. 359/725–733
See application file for complete search history.

(56) References Cited

U.S. PATENT DOCUMENTS 4,284,331 A   8/1981  Tanaka
5,039,211 A   8/1991  Maruyama
(Continued)

FOREIGN PATENT DOCUMENTS

CN   1315098   5/2007
EP   1 333 318   8/2003
(Continued)

OTHER PUBLICATIONS

International Search Report issued Jun. 8, 2010 in International (PCT) Application No. PCT/JP2010/002470.

(Continued)

*Primary Examiner* — Zachary Wilkes
(74) *Attorney, Agent, or Firm* — Wenderoth, Lind & Ponack, L.L.P.

(57) ABSTRACT

An optical system includes: a main mirror (11) having a shape of a portion of a convex paraboloid which includes an opening in a center and is rotationally symmetric; a second-reflection mirror (12) which further reflects light reflected by the main mirror (11), and has a shape of a portion of a concave paraboloid which is rotationally symmetric; at least one lens which forms an image of the light reflected by the second-reflection mirror (12); and a lens barrel (14) holding the at least one lens, and a position of a front principal point of the at least one lens coincides with a focal position of the second-reflection mirror (12), and an optical axis of the at least one lens is tilted with respect to a rotational axis of each of the convex paraboloid and the concave paraboloid.

8 Claims, 15 Drawing Sheets

U.S. PATENT DOCUMENTS

| | | | |
|---|---|---|---|
| 5,854,713 A | 12/1998 | Kuroda et al. | |
| 6,130,783 A * | 10/2000 | Yagi et al. | 359/627 |
| 6,449,103 B1 * | 9/2002 | Charles | 359/725 |
| 6,897,883 B1 | 5/2005 | Kumata et al. | |
| 7,312,810 B2 * | 12/2007 | Hayashi et al. | 348/37 |
| 2003/0218684 A1 | 11/2003 | Horiguchi et al. | |
| 2004/0027689 A1 | 2/2004 | Sogabe et al. | |
| 2004/0104996 A1 | 6/2004 | Hayashi et al. | |
| 2009/0034086 A1 | 2/2009 | Montgomery et al. | |

FOREIGN PATENT DOCUMENTS

| | | |
|---|---|---|
| JP | 61-10047 | 3/1986 |
| JP | 2-124521 | 5/1990 |
| JP | 2939087 | 8/1999 |
| JP | 2001-333303 | 11/2001 |
| JP | 2002-196438 | 7/2002 |
| JP | 2003-163819 | 6/2003 |
| JP | 2003-344773 | 12/2003 |
| JP | 2004-312593 | 11/2004 |
| JP | 2005-172970 | 6/2005 |
| JP | 2008-537157 | 9/2006 |
| JP | 2007-264402 | 10/2007 |
| WO | 2006/112536 | 10/2006 |

OTHER PUBLICATIONS

T. Thanh et al., "Robust and Real-time Rotation Estimation of Compound Omnidirectional Sensor", 2007 IEEE International Conference on Robotics and Automation, Rome, Italy, Apr. 10-14, 2007.

* cited by examiner

OPTICAL SYSTEM AND IMAGING DEVICE

This application is a U.S. National Stage entry of PCT/JP2010/002470 filed Apr. 5, 2010, the content of which is hereby incorporated by reference.

TECHNICAL FIELD

The present invention relates to optical systems which allow wide-angle image capturing, and relates particularly to an optical system having a single viewpoint.

BACKGROUND ART

Recently, a concept of "wearable computing" using a constant-wearable device has been proposed. Particularly, a camera intended for constant wearing and constant capturing (hereinafter, described as a "wearable camera") is capable of recording an experience of a wearer lively as it is, and various applications thereof can be considered.

One of features necessary for such a wearable camera is an angle of view comparable to a human visual field. Conventionally, for an optical system which allows such a wide angle of view, an optical system using a fisheye lens or a convex mirror has been used. Above all, an optical system using a parabolic mirror or a hyperboloidal mirror for the convex mirror has a feature of single viewpoint, that is, having properties that reflected light converges on a single point. For example, Patent Literature 1 discloses a configuration of an omnidirectional visual sensor having a single viewpoint as described above. With a configuration disclosed in Patent Reference 1, as shown in FIG. 1, light 205 proceeding to a focal point 202 of a hyperboloidal portion 201 of one of two sheets is reflected toward a focal point 204 of a hyperboloidal portion 203 of the other of the two sheets. Thus, it is possible to obtain an image having a single viewpoint by providing a mirror having a shape of the hyperboloidal portion 201 of the one of the two sheets and positioning a lens at the focal point 204 of the hyperboloidal portion 203 of the other one of the two sheets. Note that in the case of a set lens including a plurality of lenses, the same effect can be produced by positioning the front principal point of the lens group at the focal point 204 of the hyperboloidal portion 203 of the other one of the two sheets.

An advantage of having a single viewpoint is to allow a captured image to have the same projection characteristics as those of a general camera. This produces advantageous effects such as allowing applying, to the captured image, general image processing based on image geometry, or to convert the captured image into a general perspective projection image without distortions.

[Citation List]
[Patent Literature]

[PTL 1] Japanese Patent No. 2939087

[PTL 2] Japanese Unexamined Patent Application Publication No. 2007-264402

SUMMARY OF INVENTION

[Technical Problem]

On the other hand, compactness is another important feature for an optical system in a wearable camera. In the optical system disclosed in Patent Literature 1, which uses a hyperboloidal mirror for a convex mirror, the geometric characteristics thereof render a distance between the mirror and the lens dependent on the curvature of the hyperboloid. To reduce the distance between the mirror and the lens, it is necessary to increase the curvature of the hyperboloid; however, a larger curvature results in an out-of-focus image unless a sufficient depth of field is secured. It is possible to reduce defocusing level by stopping down an aperture, but this results in a darker image in compensation.

On the other hand, disclosed as another technique for downsizing is, for example, an optical system which reduces a substantial distance between the mirror and the lens by deflecting a light path through plural reflections, and Patent Literature 2 discloses such an omnidirectional optical system.

However, the configuration disclosed in Patent Literature 2 deflects the light path in a height direction, but this does not change the light path in a mirror-radius direction. Accordingly, this allows downsizing only in the height direction. Although it is possible to improve size in the mirror-radius direction by introducing another mirror for deflecting the light path into the radius direction as well, not only does this cause difficulty in designing of the optical system that allows introducing such another mirror, but it also causes another practical problem of making it more difficult to position the mirrors without errors as the number of mirrors increases.

In addition, generally, a horizontal human visual field is approximately 200 degrees. Thus, in the case of using a convex mirror to obtain such a horizontal visual field, as shown in FIG. 2A, it is only necessary to use a portion 311 of a convex mirror 301, as shown in FIG. 2B, instead of using a whole circumference of the convex mirror 301. However, as shown in FIG. 2B, when an optical axis 16 of a lens group 13 coincides with an axis 305 of the convex mirror 301, an invalid imaging region 312 in which the convex mirror is not reflected is generated within the angle of view of the lens group 13. This problem also arises in a system which performs a plurality of reflections as described in the configuration in Patent Literature 2.

The present invention is conceived for the reasons described above, and it is an object of the present invention to provide a compact optical system which allows wide-angle image capturing, has a single viewpoint, and suppresses generation of the invalid region in the capture image.

[Solution to Problem]

An optical system according to an aspect of the present invention includes: a main mirror having a shape of a portion of a convex paraboloid which includes an opening in a center and is rotationally symmetric; a second-reflection mirror which further reflects light reflected by the main mirror, the second-reflection mirror having a shape of a portion of a concave paraboloid which is rotationally symmetric; at least one lens which forms an image of the light reflected by the second-reflection mirror; and a lens barrel holding the at least one lens, and a position of a front principal point of the at least one lens coincides with a focal position of the second-reflection mirror, and an optical axis of the at least one lens is tilted with respect to a rotational axis of each of the convex paraboloid and the concave paraboloid.

With this configuration, as shown in FIG. 3B, it is possible to capture (perform imaging of) a second-reflection mirror 12 (an image of a main mirror 11 reflected therein) to a full extent within the angle of view of a lens group 13 by positioning the optical axis 16 of the lens group 13 at a tilt, in contrast to the case where, as shown in FIG. 3A, an invalid imaging area 312 exists within the angle of view of the lens group 13 when the optical axis 16 of the lens group 13 (at least one lens) coincides with the rotation axes of a convex paraboloid and a concave paraboloid. FIGS. 3C and 3D schematically show images obtained by a system represented by FIGS. 3A and 3B, respectively, with FIG. 3D clearly showing a smaller invalid region in which the image in the second-reflection mirror 12 is not reflected than an invalid region in FIG. 3C. Note that FIG. 3D is a schematic diagram which looks enlarged lengthwise from a real image, but in practice an almost semicircular image can be obtained. In addition, a hatched portion in the semicircular center is an image of an opening of the main mirror.

Thus, each of the main mirror 11 and the second-reflection mirror 12 has a shape of a portion of a corresponding one of the convex paraboloid and concave paraboloid that are rotationally symmetric. This allows reducing size in the mirror-radius direction compared to the conventional optical system having entire shapes of the convex paraboloid and concave paraboloid. Accordingly, it is possible to provide a compact optical system which allows wide-angle image capturing, has a single viewpoint, and suppresses generation of an invalid region in the capture image.

In addition, the at least one lens may be a lens group including at least two lenses, and the lens group may be included in a zoom lens.

Preferably, the optical system described above further includes a movement portion having a structure with which the lens barrel is moved forward and backward along an optical axis of the lens group, and the movement portion has a structure with which the lens barrel is moved to a point at which a variation in the position of the front principal point is offset, and at which the position of the front principal point of the lens group coincides with the focal position of the second-reflection mirror, the variation being caused by change in a zoom factor of the lens group.

With this configuration, it is also possible to fix the position of the front principal point when obtaining an enlarged image by zooming, thus allowing obtaining an advantage of having a single viewpoint equally in zooming.

In addition, the lens group may have a configuration in which the front principal point is not moved by change in a zoom factor.

With this configuration, it is also possible to fix the position of the front principal point when obtaining an enlarged image by lens zooming, thus allowing obtaining an advantage of having a single viewpoint equally in zooming.

In addition, the optical system described above may further include a gimbal mechanism holding the lens barrel and allowing the optical axis of the lens group to rotate in a biaxial direction, and a rotational axis in each direction of the gimbal mechanism may pass through the focal position of the second-reflection mirror.

With this configuration, it is possible to match a rotational center of the lens group in pan-tilt motion with the position of the front principal point of the lens group, thus making it possible to hold the single viewpoint equally in pan-tilt motion.

[Advantageous Effects of Invention]

Accordingly, it is possible to provide a compact optical system which allows wide-angle image capturing, has a single viewpoint, and suppresses generation of an invalid region in a capture image.

DESCRIPTION OF EMBODIMENTS

Hereinafter, embodiments of the present invention will be described with reference to the drawings.

[Embodiment 1]

First, an optical system according to a first embodiment of the present invention will be described.

Figure 4:
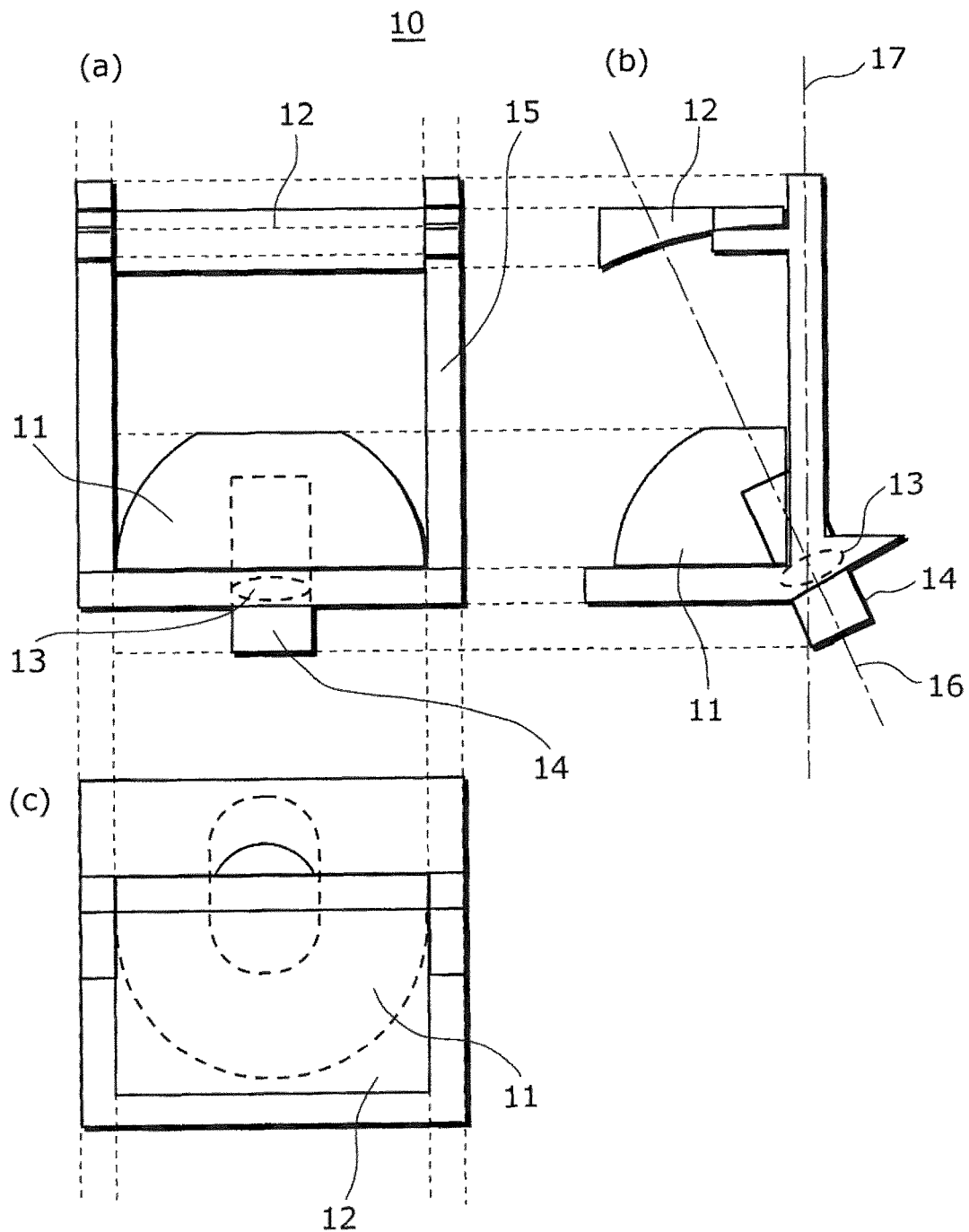
FIG. 4 is a diagram schematically showing a configuration of an optical system according to a first embodiment.

FIG. 4 is a diagram schematically showing a configuration of an optical system 10 according to the first embodiment. FIGS. 4(a), 4(b), and 4(c) show a front view, a right side view, and a top view of the optical system 10, respectively.

The optical system 10 includes: a main mirror 11, a second-reflection mirror 12, a lens group 13, a lens barrel 14, and a base 15. The lens barrel 14 is fixed to the base 15 so that an optical axis 16 of the lens group 13 is tilted with respect to a rotational axis 17 of the second-reflection mirror 12. Note that the rotational axis 17 of the second-reflection mirror 12 and the rotational axis of the main mirror 11 should preferably be parallel. Illustrated here is the case where the two rotational axes coincide with each other.

The main mirror 11 reflects a light ray proceeding from space to the second-reflection mirror 12. The main mirror 11 has an opening in the center, and includes a portion of a convex surface which is rotationally symmetric. Such a rotationally-symmetric surface, for example, is a quadric surface defined by Expression (1).

[Math. 1]

$$z = \frac{cr^2}{1 + \sqrt{1 - (1+k)(cr)^2}}$$

Expression (1)

c represents a curvature of a curved surface, k represents a conic constant, and r represents a distance from a central axis of the quadric surface. For example, a paraboloid can be obtained where the conic constant k=−1, and a hyperboloid can be obtained where k<−1. The rotational axis of the main mirror 11 described above is a rotational axis of the rotationally-symmetric convex surface described above.

The second-reflection mirror 12 reflects the reflected light from the main mirror 11, toward the lens group 13. As with the main mirror 11, the second-reflection mirror 12 includes a portion of a concave surface that is rotationally symmetric. This rotationally-symmetric concave surface is also defined by Expression (1) above. The rotational axis of the second-reflection mirror 12 described above is the rotational axis of the rotationally-symmetric concave surface described above.

The lens group 13 is made of plastic or glass, and collects light rays reflected from the second-reflection mirror 12. Note that FIG. 4 illustrates, for ease of reference, the lens group 13 as a single lens, but according to an embodiment of the present invention, the number of lenses is not limited to one, and two or more lenses may be used.

The lens barrel 14 holds a positional relationship between the respective lenses included in the lens group 13 under a specific condition.

The base 15 holds the main mirror 11, the second-reflection mirror 12, and the lens barrel 14 under a specific condition.

Here described is a condition with which the light reflected by the second-reflection mirror 12 converges on a single point at the focal position of the second-reflection mirror 12.

Generally, to realize the single viewpoint using a reflecting mirror having a quadric surface, there are techniques of using a hyperboloidal mirror and using a parabolic mirror. Of these, the technique of using a hyperboloidal mirror is disclosed in Patent Literature 1.

Figure 5:
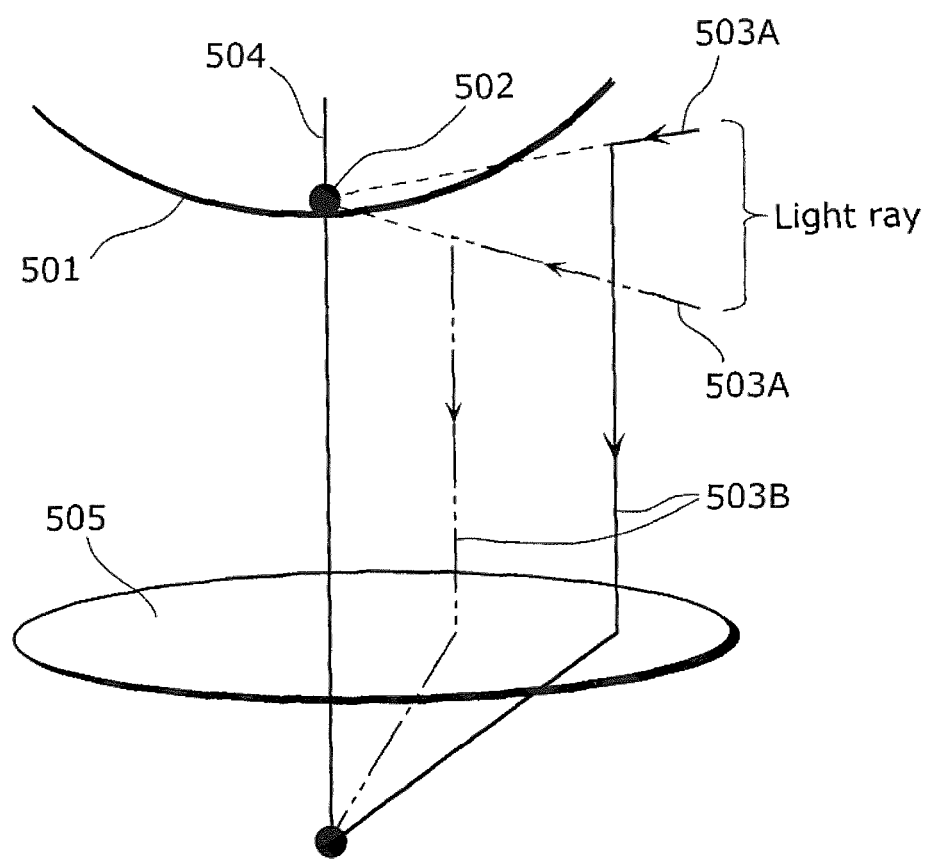
FIG. 5 is a diagram showing that a reflecting mirror for which a parabolic convex mirror is used holds a single viewpoint.

The other technique of using a parabolic mirror, as shown in FIG. 5, takes advantage of the properties that a light ray 503A, which is reflected by the parabolic convex mirror 501 and then proceeds to a focal point 502 of the parabolic convex mirror 501, becomes parallel light 503B that is parallel to the rotational axis 504 of the paraboloid (hereinafter described as "parallel light"). It is possible to collect such parallel light, using a telecentric lens 505 (particularly an object-side telecentric lens) as a lens for forming the parallel light 503B into an image.

However, the telecentric lens 505 is often a "dark" lens generally having a small aperture, and this is likely to increase the size of the entire lens, thus having a disadvantage of not being suited for downsizing of the entire optical system.

Figure 6:
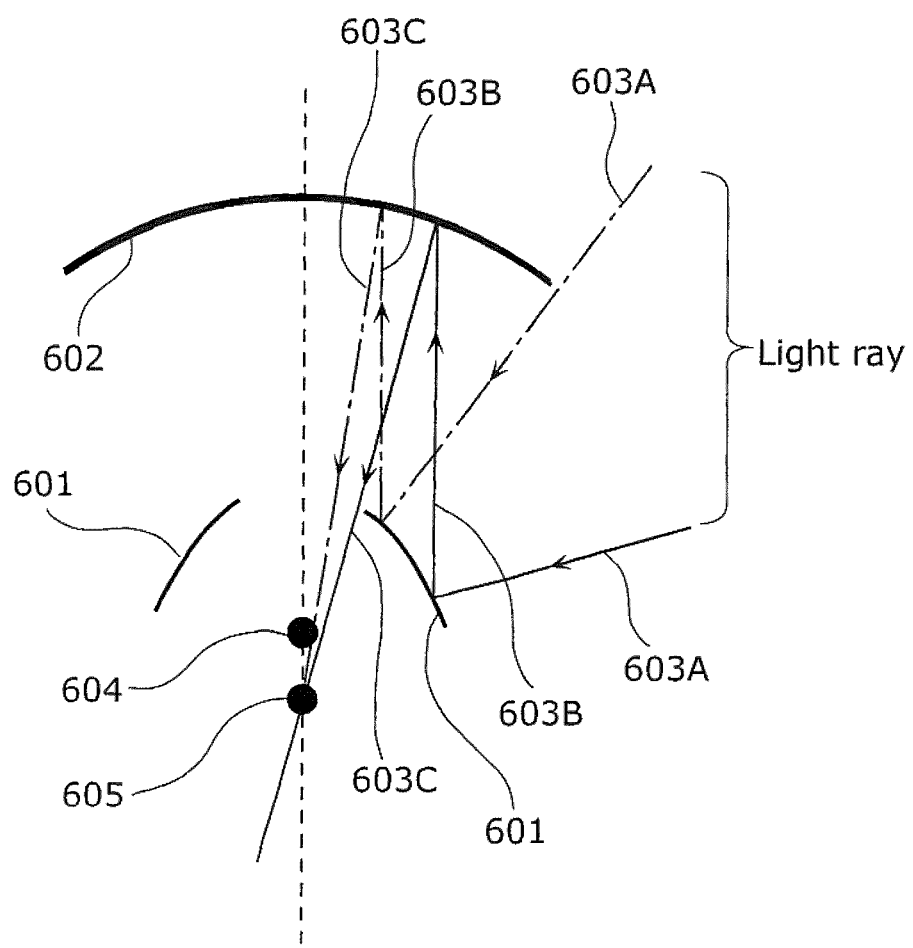
FIG. 6 is a diagram showing that a reflecting mirror for which a parabolic convex mirror and a parabolic concave mirror are used holds a single viewpoint.

In contrast, another imaging technique that does not use the telecentric lens 505 is, as shown in FIG. 6, a technique to combine a parabolic convex mirror 601 and a parabolic concave mirror 602. The parabolic concave mirror 602 has properties that render parallel light 603B convergent on a focal point 605 of the parabolic concave mirror 602. Since reflected light 603C, reflected by the parabolic concave mirror 602, is no longer parallel light, it is possible to collect the reflected light 603C using an ordinary lens that is not the telecentric lens 505. That is, a light ray 603A proceeding to a focal point 604 of the parabolic convex mirror 601 is reflected by the parabolic convex mirror 601 and turns into the parallel light 603B, and is subsequently reflected toward a focal point 605 of the parabolic concave mirror 602. Positioning an ordinary lens at a focal point 605 of the parabolic concave mirror 602 makes it possible to collect the reflected light 603C using the parabolic concave mirror 602. In the case of using the lens group including plural lenses, it is possible to deal with the lens group in the same manner as in the case of using a single lens, by positioning the lens group so that the front principal point of the lens group coincides with the focal point 605 of the parabolic concave mirror 602. Thus, since the light, which is reflected by the parabolic convex mirror 601 and proceeds to the parabolic concave mirror 602, turns into the parallel light 603B, it is possible to change the distance between the parabolic convex mirror 601 and the parabolic concave mirror 602.

Figure 7:
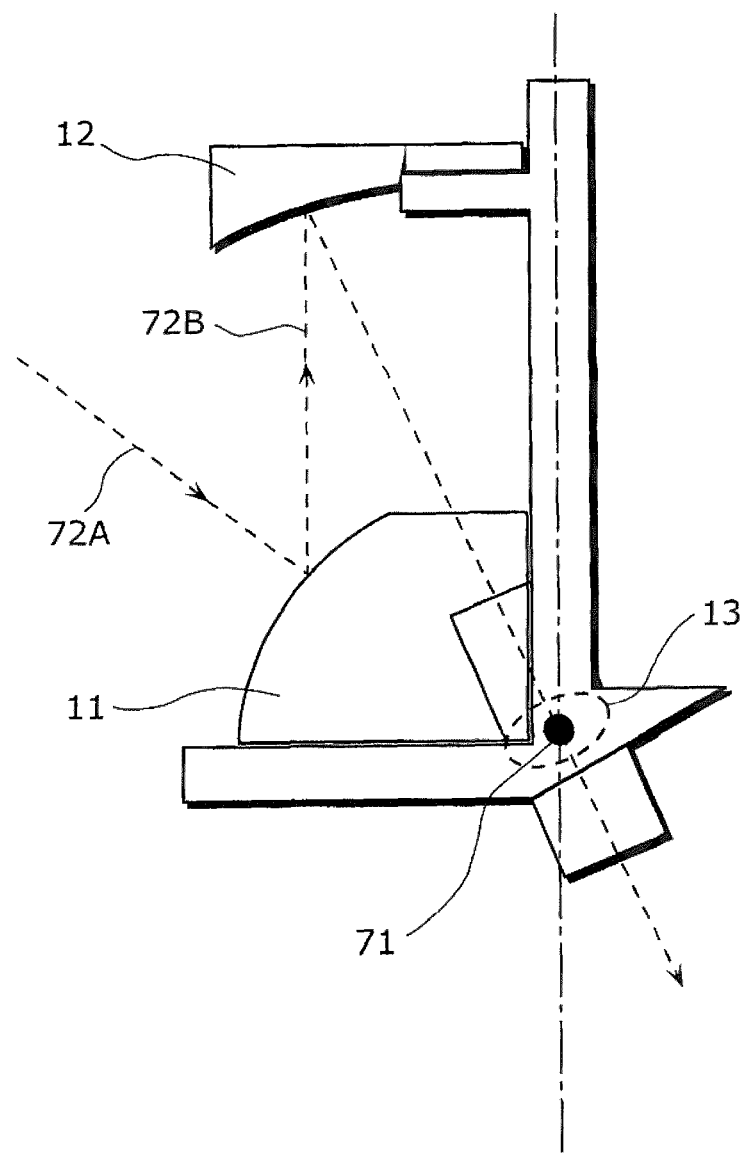
FIG. 7 is a diagram showing how a light ray is reflected by the optical system according to the first embodiment.

FIG. 7 shows how a light ray is reflected by the optical system according to the first embodiment, based on the properties described above. However, it is assumed here that the curved surface included in the main mirror 11 is a portion of a convex paraboloid, and that the curved surface included in the second-reflection mirror 12 is a portion of a concave paraboloid. A light ray 72A proceeding to a focal point 71 of the main mirror 11 is reflected by the main mirror 11 and turns into parallel light 72B, which is then incident on the second-reflection mirror 12. Furthermore, the parallel light 72B is reflected by the second-reflection mirror 12 toward the focal point thereof, to be collected by the lens group 13.

Note that the lens group 13 is placed at a position at which the focal point 71 of the main mirror 11 and the front principal point of the lens group 13 coincide with each other.

Figure 1:
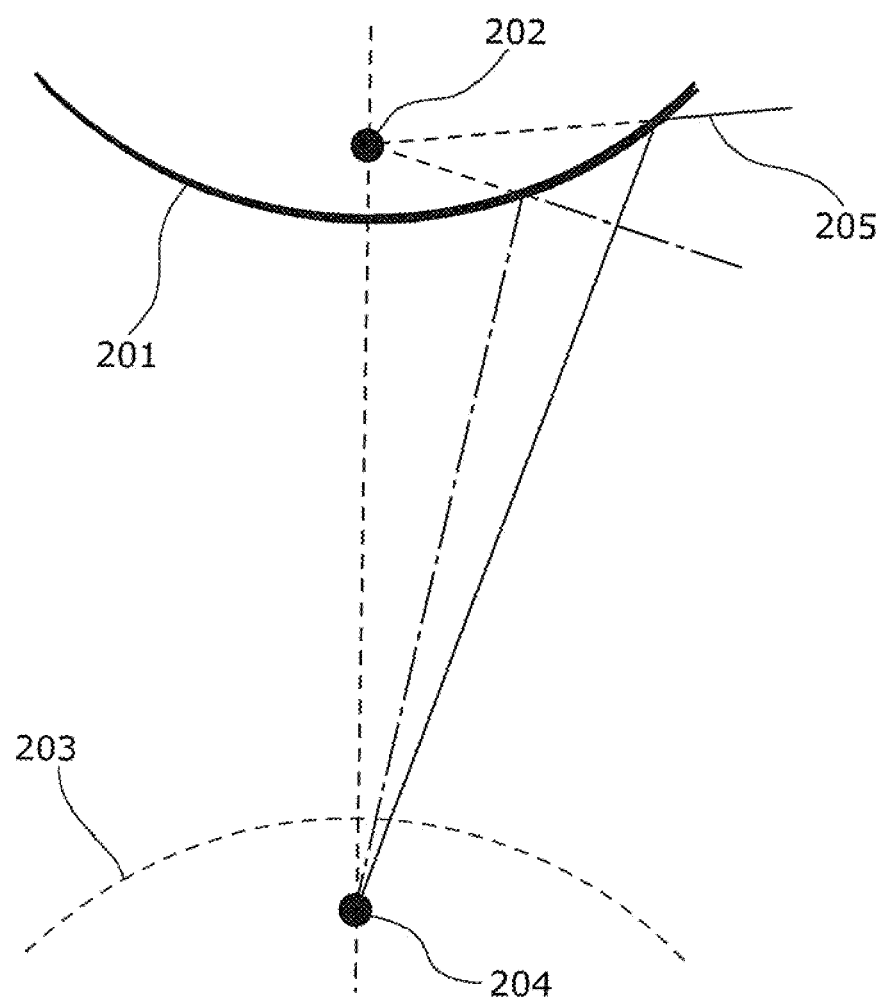
FIG. 1 is a diagram showing that a reflecting mirror for which a hyperboloidal mirror is used holds a single viewpoint.
Figure 2A:
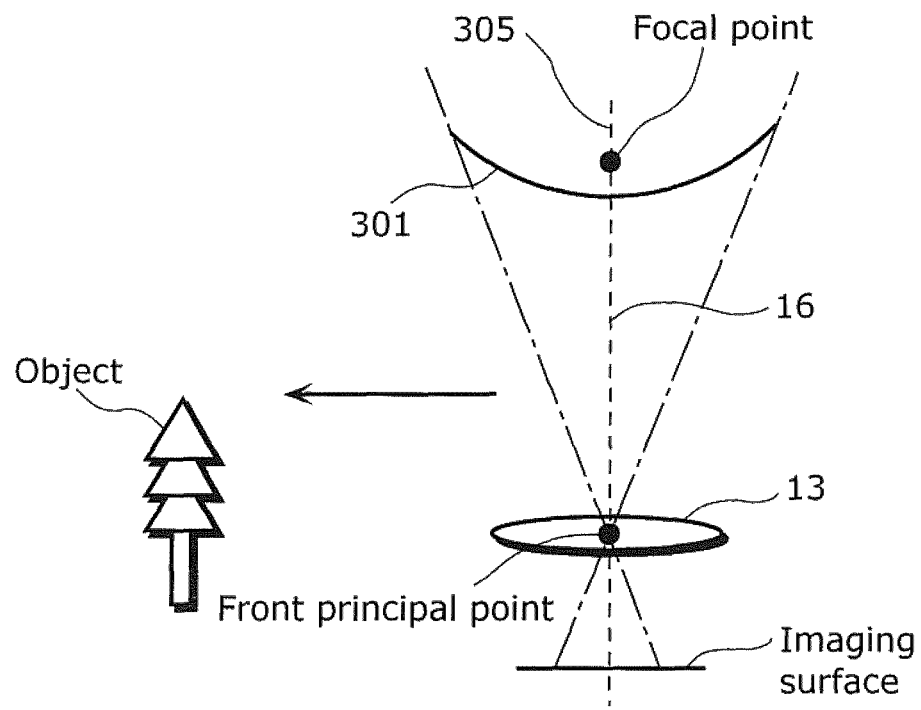
FIG. 2A is a schematic view showing a mirror size in a conventional optical system.
Figure 2B:
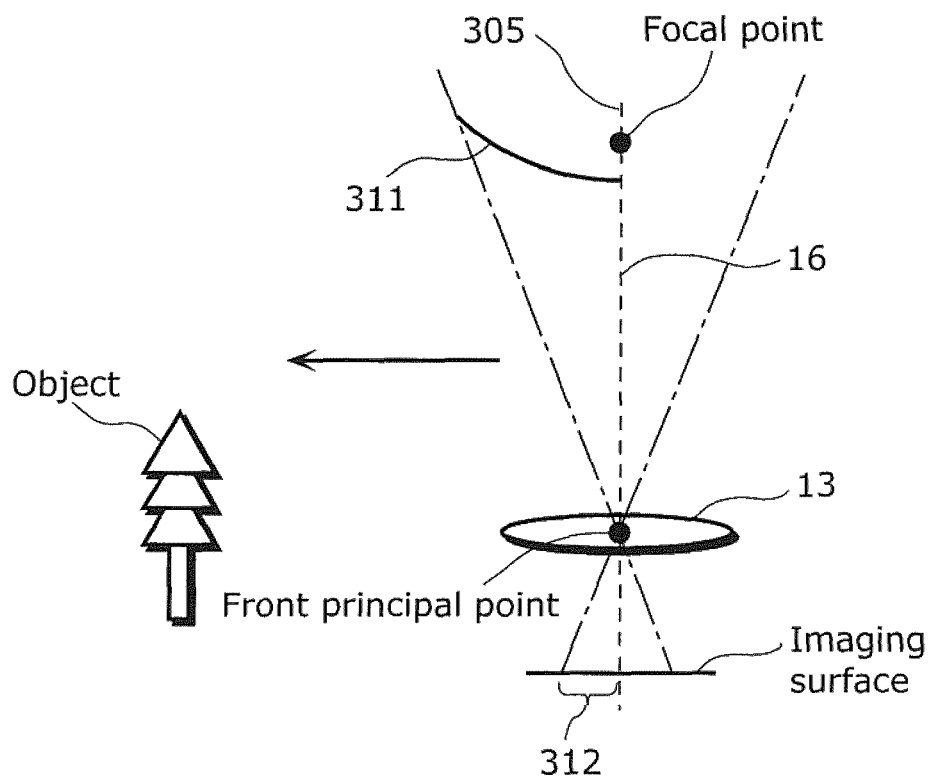
FIG. 2B is a schematic diagram showing a mirror size required to secure front view.
Figure 3A:
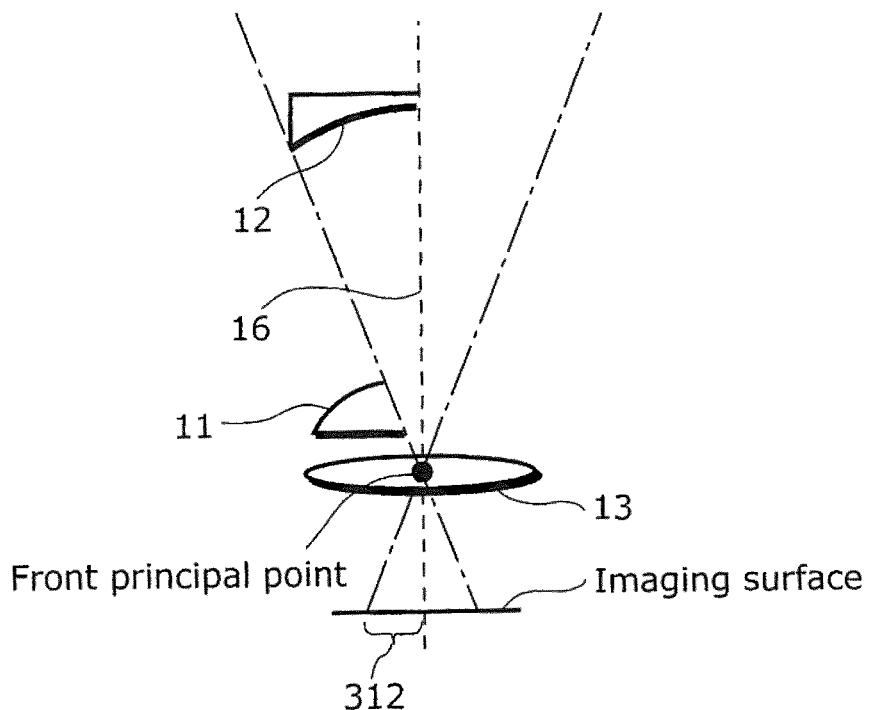
FIG. 3A is a diagram showing an effective imaging region in the case of not tilting an optical axis.
Figure 3B:
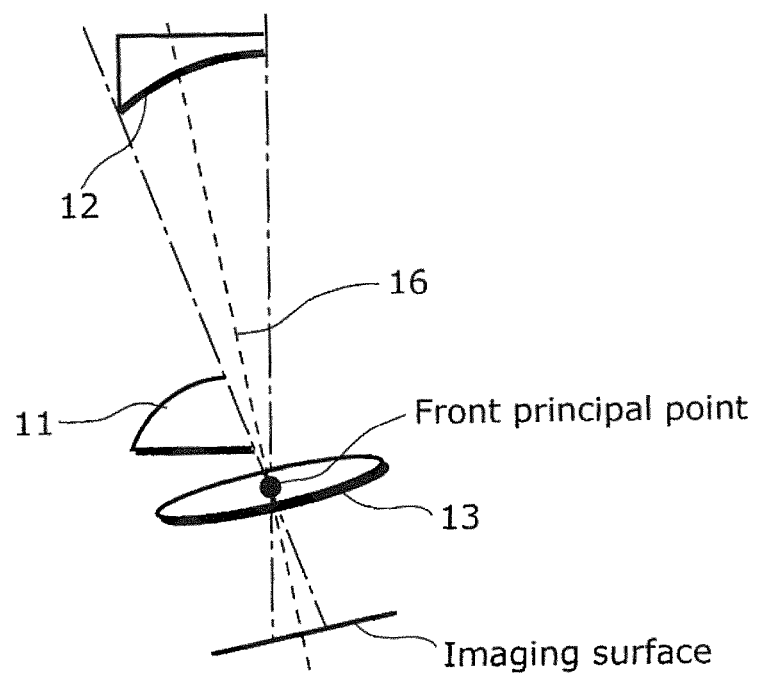
FIG. 3B is a diagram showing that tilting an optical axis increases a valid imaging region.
Figure 3C:
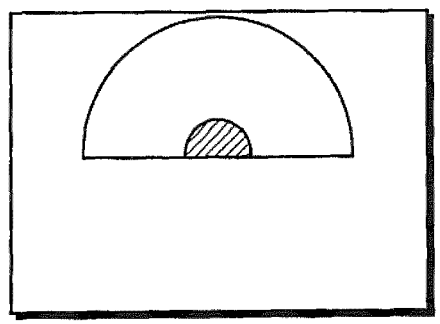
FIG. 3C is a diagram schematically showing an image obtained by an optical system shown in FIG. 3A.
Figure 3D:
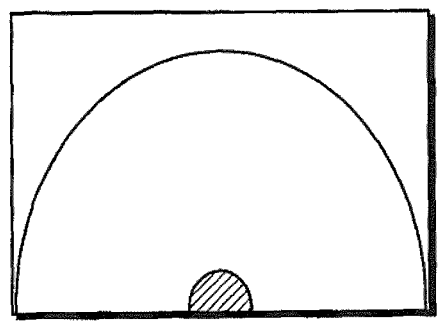
FIG. 3D is a diagram schematically showing an image obtained by an optical system shown in FIG. 3B.

Note that according to this optical system, it is possible to capture an image of the main mirror 11 as shown in FIG. 3D.

As described above, according to the first embodiment of the present invention, it is possible to capture the second-reflection mirror 12 (an image of the main mirror 11 reflected therein) to a full extent within the angle of view of the lens group 13 as shown in FIG. 3B by positioning the optical axis 16 of the lens group 13 at a tilt, in contrast to the case where, as shown in FIG. 3A, an invalid imaging area 312 exists within the angle of view of the lens group 13 when the optical axis 16 of the lens group 13 coincides with the rotation axes of the main mirror 11 and the second-reflection mirror 12. FIGS. 3C and 3D schematically show an image obtained by the system represented by FIGS. 3A and 3B, respectively, with FIG. 3D clearly showing a smaller invalid region in which the image in the second-reflection mirror 12 is not reflected than an invalid region in FIG. 3C. Note that FIG. 3D is a schematic diagram which looks enlarged lengthwise from a real image, but in practice an almost semicircular image can be obtained. In addition, a hatched portion in the semicircular center is an image of an opening of the main mirror 11.

In addition, each of the main mirror 11 and the second-reflection mirror 12 has a shape of a portion of a corresponding one of the convex paraboloid and concave paraboloid that are rotationally symmetric. This allows reducing size in the mirror-radius direction compared to the conventional optical system having the entire shapes of the convex paraboloid and concave paraboloid. Accordingly, it is possible to provide an optical system which allows wide-angle image capturing, has a single viewpoint, and is compact.

In addition, as is clear from a comparison between the conventional optical system shown in FIG. 3A and the optical system according to the present embodiment as shown in FIG. 3B, tilting the optical axis 16 of the lens group 13 results in a smaller angle of view of the lens group 13 required for capturing the entire second-reflection mirror 12. Generally, the larger the angle of view of the lens is, that is, the shorter the focal distance is, the larger the influence of a falloff in light amount at edges; thus, it is possible to reduce such influence to a greater extent for a smaller angle of view.

(Embodiment 2)

An optical system according to a second embodiment of the present invention has a mechanism which allows holding a single viewpoint even in zoom and in pan-tilt motion of a lens.

The following will describe an optical system according to the second embodiment of the present invention.

Figure 8:
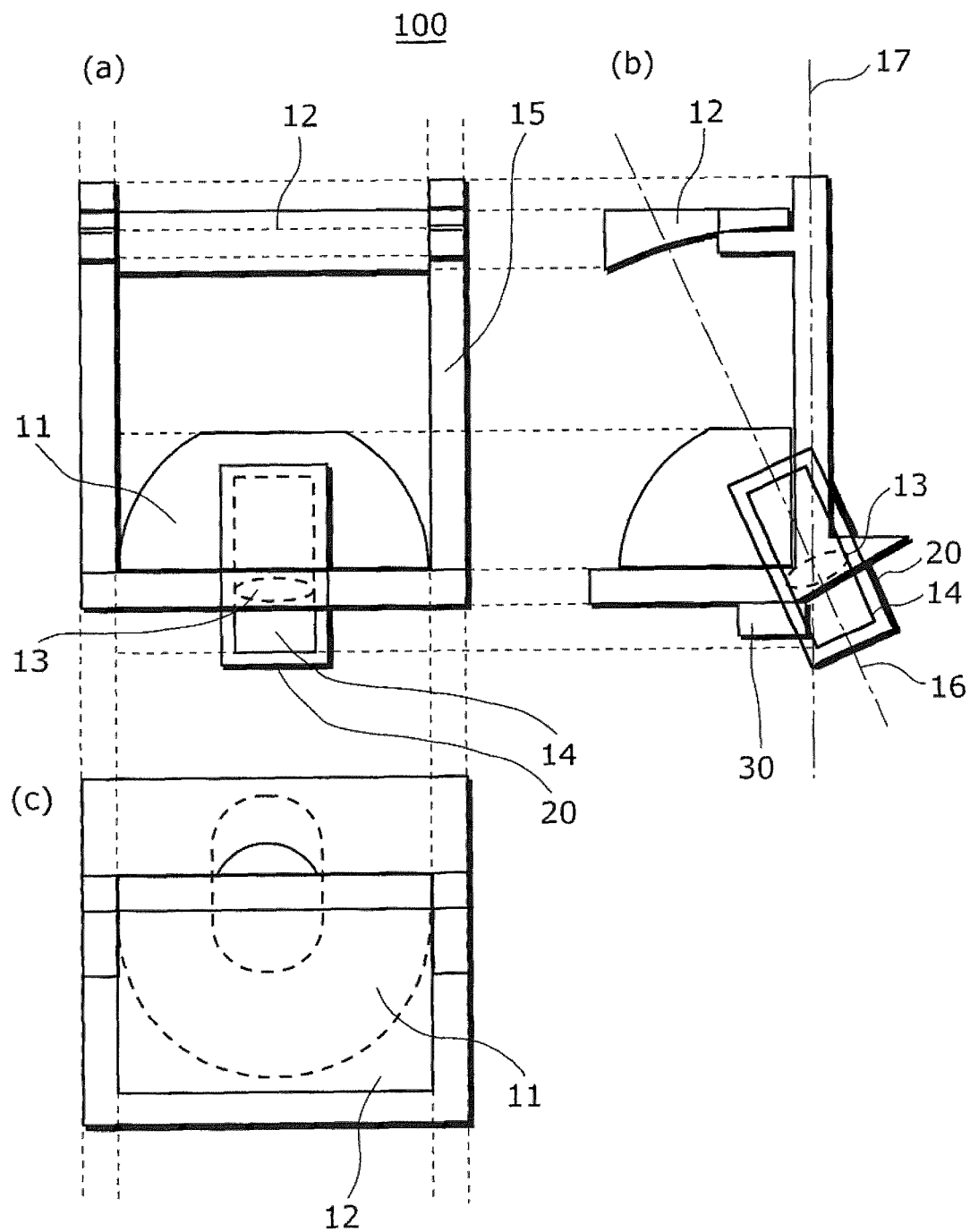
FIG. 8 is a diagram schematically showing a configuration of an optical system according to a second embodiment.

FIG. 8 is a diagram schematically showing a configuration of an optical system 100 according to the second embodiment. FIGS. 8(a), 8(b), and 8(c) show a front view, a right side view, and a top view of the optical system 100, respectively.

The optical system 100 has a configuration which further includes, in addition to the optical system 10 according to the first embodiment, a holding portion 20 and a control unit 30. Since the function of the configuration except for the holding portion 20 and the control unit 30 is the same as the configuration of the optical system 10 according to the first embodiment, the following will describe only a portion different from the optical system 10.

The holding portion 20 has a function to fix the lens barrel 14 to the base 15, with a position and posture of the lens barrel 14 held in a changeable state. The holding portion 20 includes a movement portion 21 and a two-axis gimbal 22.

Figure 9A:
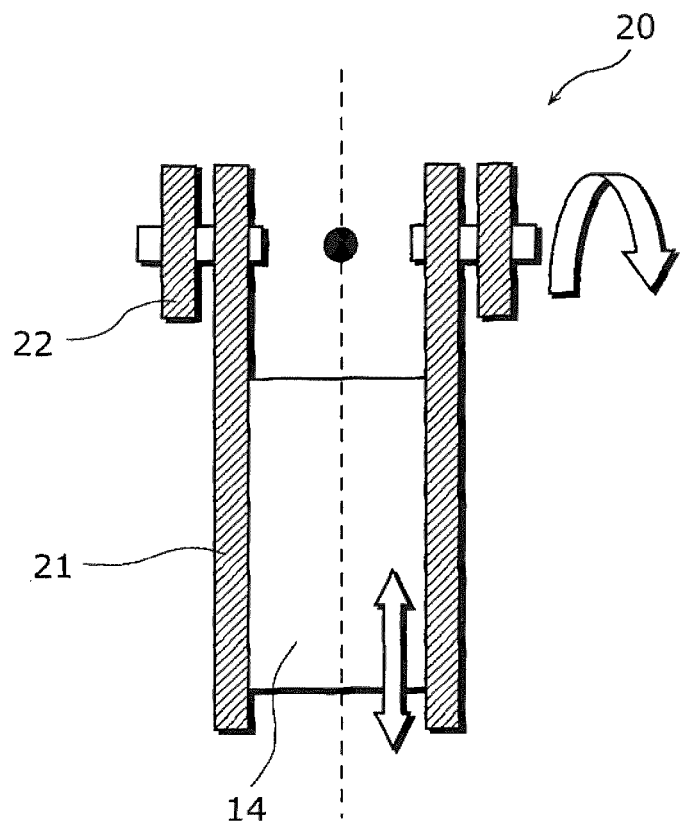
FIG. 9A is a diagram schematically showing a configuration of a holding portion.
Figure 9B:
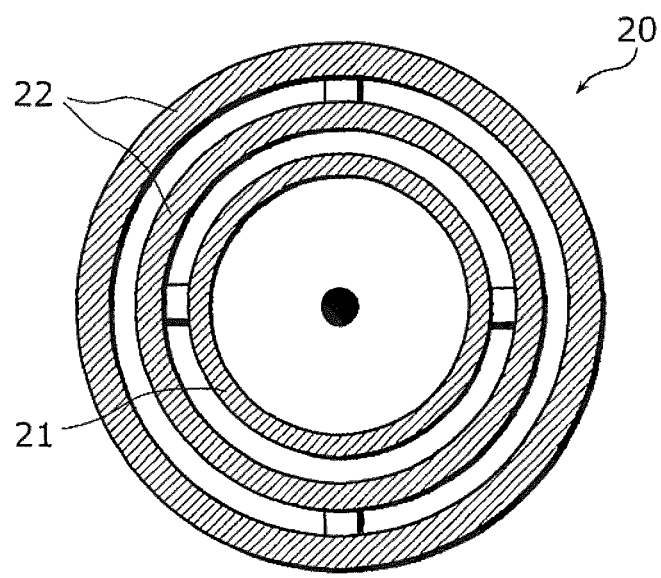
FIG. 9B is a diagram schematically showing a configuration of the holding portion.

FIGS. 9A and 9B are diagrams schematically showing a configuration of the holding portion 20: FIG. 9A is a cross-sectional view of the holding portion 20 along an optical axis of the lens group 13, and FIG. 9B is a diagram of the holding portion 20 as seen from a direction of the optical axis.

The movement portion 21 has a function to move the lens barrel 14 forward and backward along the optical axis of the lens group 13. For example, a specific configuration includes an external barrel and a cam around the lens barrel 14, and rotating the lens barrel 14 around the optical axis of the lens group 13 allows the lens barrel 14 to move forward and backward. In addition, the lens barrel 14 may be moved forward and backward along the optical axis, with a groove provided in one of the lens barrel 14 and the external barrel, and with a protruding portion provided in the other to fit the groove.

The two-axis gimbal 22 has a function to hold the lens barrel 14 in a rotatable state centering on a specific point. The two-axis gimbal 22 is attached such that the rotational center thereof coincides with the focal position of the second-reflection mirror 12. That is, the rotation axis extended in each direction of the two-axis gimbal 22 passes through the focal position of the second-reflection mirror 12, with the rotational axis extended in each direction of the two-axis gimbal 22 coincident with the focal position of the second-reflection mirror 12, and with the lens barrel 14 moving forward and backward along the optical axis of the lens 13.

The control unit 30 includes: a CPU, a random access memory (RAM), a read-only memory (ROM) in which a control program is stored, and an input unit such as a button. The control unit 30 performs zooming by changing the positional relationship between the respective lenses included in the lens group 13, in accordance with the operation performed by a user of the optical system 100. Along with this, the control unit 30 determines an amount of movement of the lens barrel 14, and causes the movement portion 21 to move the lens barrel 14. That is, the control unit 30 moves the lens barrel 14 so that the front principal point of the lens group 13 constantly coincides with the focal point of the second-reflection mirror 12.

Note that the amount of movement of the lens barrel 14 is previously determined by calculation as below. Specifically, the process includes: previously calculating the amount of displacement in position of the front principal point of the lens group 13 that is caused by change in zoom factor; and calculating, as the amount of movement of the lens barrel 14, the amount of movement of the lens group 13 which offsets the measured amount of movement of the position of the front principal point and is used for matching the position of the front principal point of the lens group 13 with the focal position of the second-reflection mirror 12. Note that adjusting a cutting state of the grove in the cam of the movement portion 21 allows the zoom factor and the movement amount of the lens barrel 14 to work in relation to each other.

Note that the position of the control unit 30 in FIG. 8 is a mere example, and in practice it is possible to attach the control unit 30 at an arbitrary position.

As described above, according to the second embodiment of the present invention, in addition to the advantageous effect described in the first embodiment, it is possible to fix the position of the front principal point even when capturing an enlarged image by lens zooming, thus allowing obtaining an advantage of having a single viewpoint equally in zooming.

In addition, it is possible to match the rotational center of the lens group 13 in pan-tilt motion with the position of the front principal point of the lens group 13, thus making it possible to continuously hold the single viewpoint equally in pan-tilt motion.

(Embodiment 3)

An optical system according to a third embodiment of the present invention includes, in addition to a main mirror, a plurality of sub mirrors and a mechanism intended to obtain distance information from a reflection image from each of the main and the sub mirrors.

The following will describe the optical system according to the third embodiment of the present invention.

Figure 10:
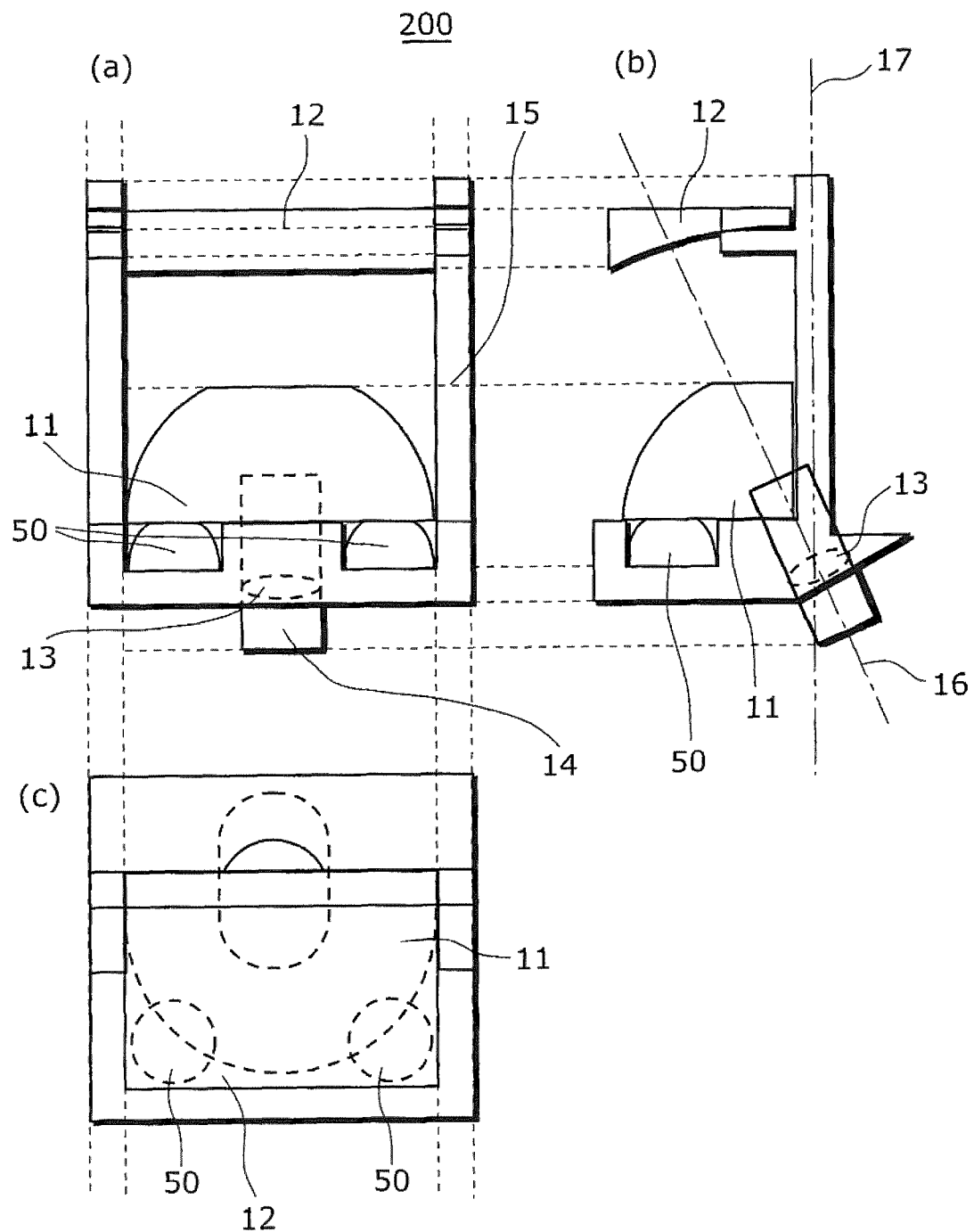
FIG. 10 is a diagram schematically showing a configuration of an optical system according to a third embodiment.

FIG. 10 is a diagram schematically showing a configuration of an optical system 200 according to the third embodiment. FIGS. 10(a), 10(b), and 10(c) show a front view, a right side view, and a top view of the optical system 200, respectively.

The optical system 200 includes sub mirrors 50 in addition to the optical system 10 according to the first embodiment. Since the function of the configuration except for the sub mirror 50 is the same as the configuration of the optical system 10 according to the first embodiment, the following will describe only a portion different from the optical system 10.

The sub mirror 50 reflects a light ray from space toward a second-reflection mirror 12. The sub mirror 50 includes a rotationally-symmetric convex surface, such as a quadric surface defined by Expression (1). At least one sub mirror 50 is included, and, in FIG. 10, two sub mirrors 50 are provided; however, the number of such mirrors is not limited by the present embodiment. Note that the rotational axis of the sub mirrors 50 should preferably coincide with the rotational axis of the main mirror 11.

Figure 11:
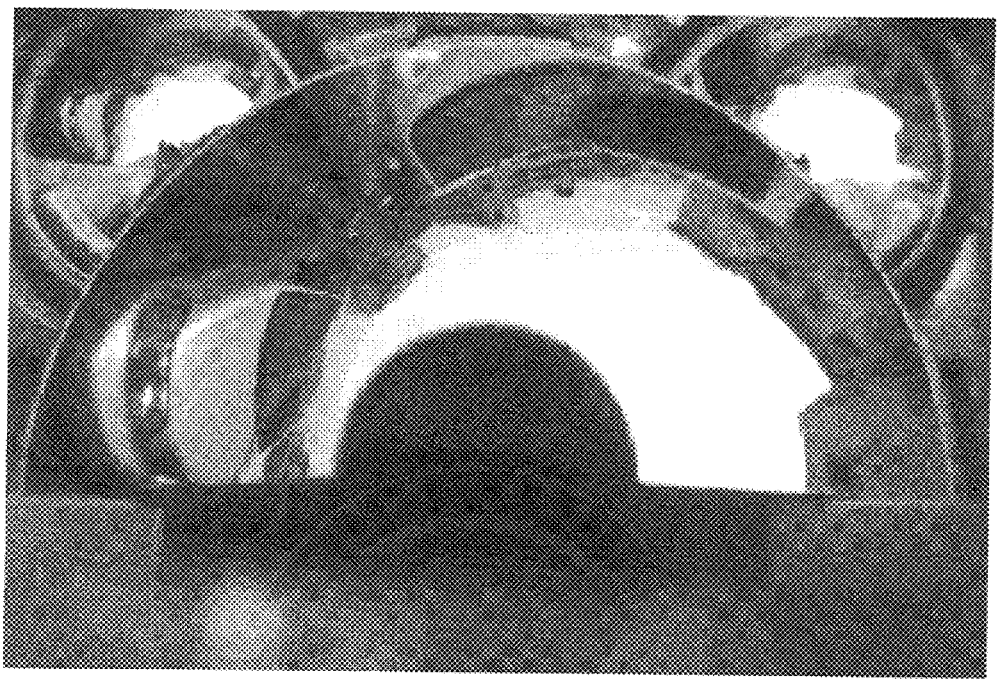
FIG. 11 is a diagram showing an image of a parking lot which is captured using an optical system shown in FIG. 10.

FIG. 11 shows, as an example, an image of a parking lot captured using the optical system 200. As shown in FIG. 11, cars, buildings in the neighborhood, and the sky are reflected in projection images of the main mirror 11 and the sub mirrors 50.

Figure 12A:
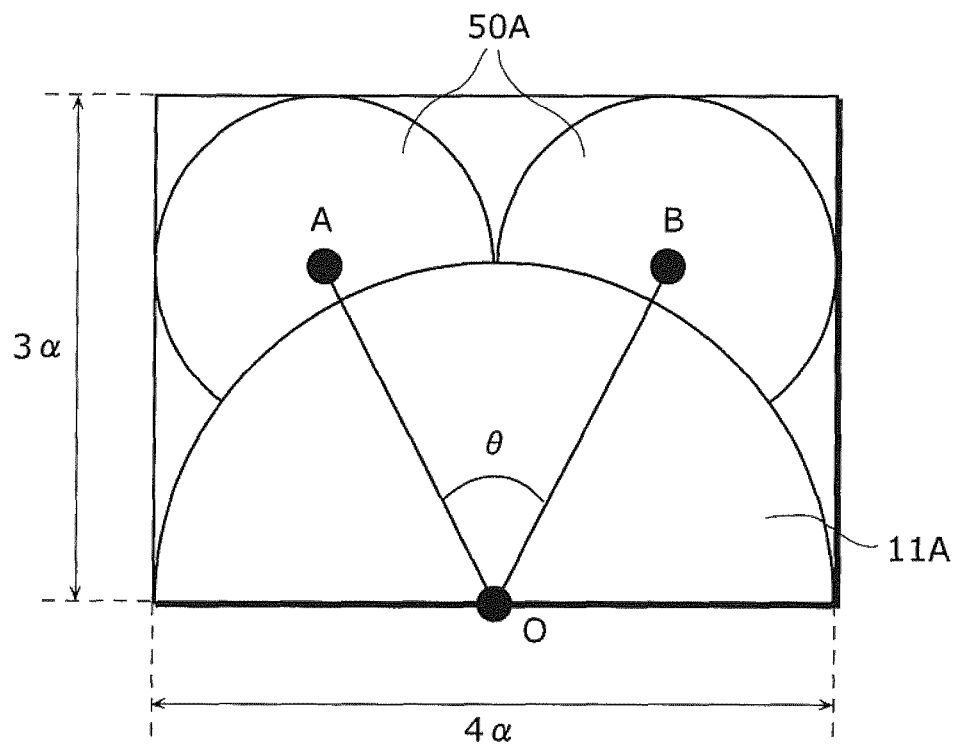
FIG. 12A is a diagram schematically showing an image captured in a certain placement of sub mirrors.

Note that when providing the sub mirrors 50, it is preferable to position the sub mirrors 50 such that no invalid region is generated in a final projection image. For example, FIG. 12A shows an image which is captured when the two sub mirrors are positioned so as to be reflected on an image having an aspect ratio of 4:3. This image includes an image 11A of the main mirror 11 and images 50A of the sub mirrors 50. Assuming that a is a radius of the sub mirrors 50 in the image, it is proved that 4a is a maximum size that does not cause the sub mirrors 50 to overlap with each other. In addition, considering the case of obtaining a 180-degree horizontal angle of view, the invalid region is the smallest where the radius of the main mirror 11 in the image is 2a with the center thereof located to a full extent in a lower part of the image. In this case, assuming that θ is an angle defined by centers A and B of the sub mirrors 50 and a center O of the main mirror 11, θ is calculated according to Expression (2) below.

[Math. 2]

$$\theta = 2\arctan\frac{\alpha}{2\alpha} \approx 53.13°$$

Figure 12B:
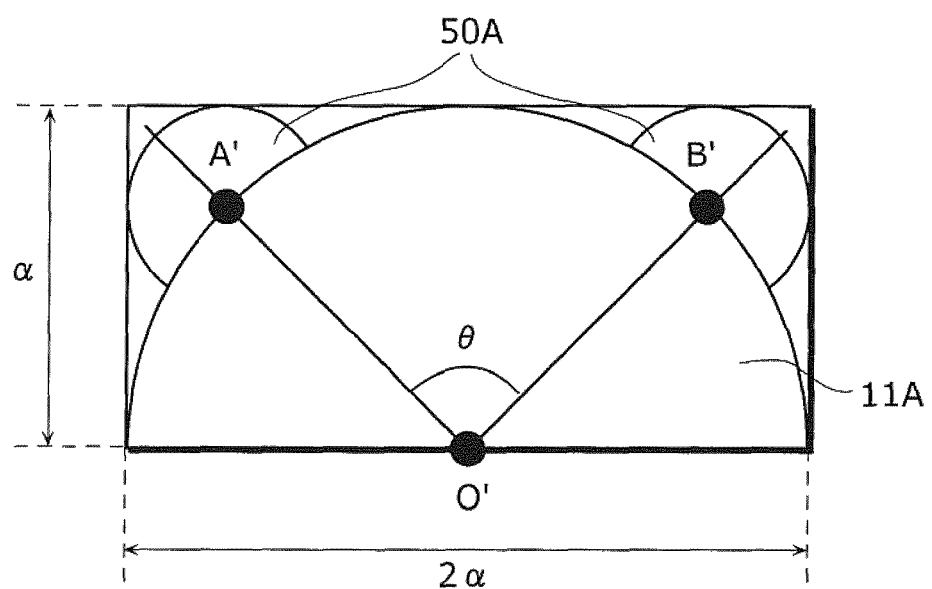
FIG. 12B is a diagram schematically showing an image captured in another placement of the sub mirrors.

In addition, this angle θ is larger in a horizontally-long image as shown in FIG. 12B, and is smaller, on the contrary, in a vertically-long image. This image includes the image 11A of the main mirror 11 and the images 50A of the sub mirrors 50. For example, as shown in FIG. 12B, θ=90° when positioning the sub mirrors 50 such that no invalid region is generated in an image having an aspect ratio 2:1. In the case of using, for an imaging system, a solid-state imaging device such as a charge coupled device (CCD) and a complementary metal oxide semiconductor (CMOS), aspect ratios 4:3, 3:2, 16:9, and the like are generally used for the image, and the invalid region in the image is smaller where 30°≦θ≦90° in the case of using such aspect ratios.

Here, a technique of obtaining the distance information from reflected images from the plural mirrors is described. Each mirror described here is a parabolic mirror.

Figure 13:
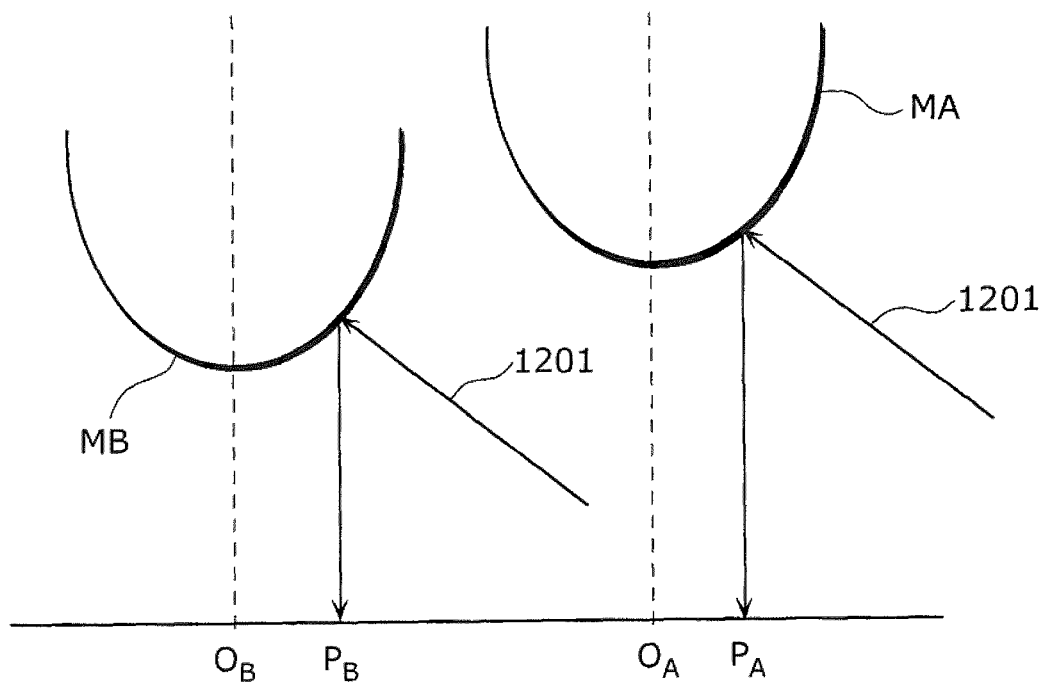
FIG. 13 is a diagram schematically showing a positional relationship between projection points when a light ray from infinity is reflected by two parabolic mirrors.

As shown in FIG. 13, the case where two parabolic mirrors MA and MB are located in space is considered. It is assumed that $C_A$ and $C_B$ are curvatures of the parabolic mirrors MA and MB, respectively. In addition, it is assumed that $O_A$ and $O_B$ are position vectors of the projection points when vertexes of the parabolic mirrors MA and MB are projected respectively onto an image plane.

Here considered is a case where a light ray 1201 from infinity is incident on the parabolic mirrors MA and MB. It is possible to consider the light ray 1201 from infinity as parallel light; thus, in the case of capturing images of these parabolic mirrors MA and MB using a telecentric lens, the light ray proceeding to the focal points of the parabolic mirrors MA and MB is projected respectively onto points $P_A$ and $P_B$ on the image plane by reflection. In this context, pixel values at the points $P_A$ and $P_B$ are equal, and the relationship between the two points is defined by Expression (3) below.

[Math. 3]

$$P_B = \frac{C_B}{C_A}(P_A - O_A) + O_B \qquad \text{Expression (3)}$$

Figure 14:
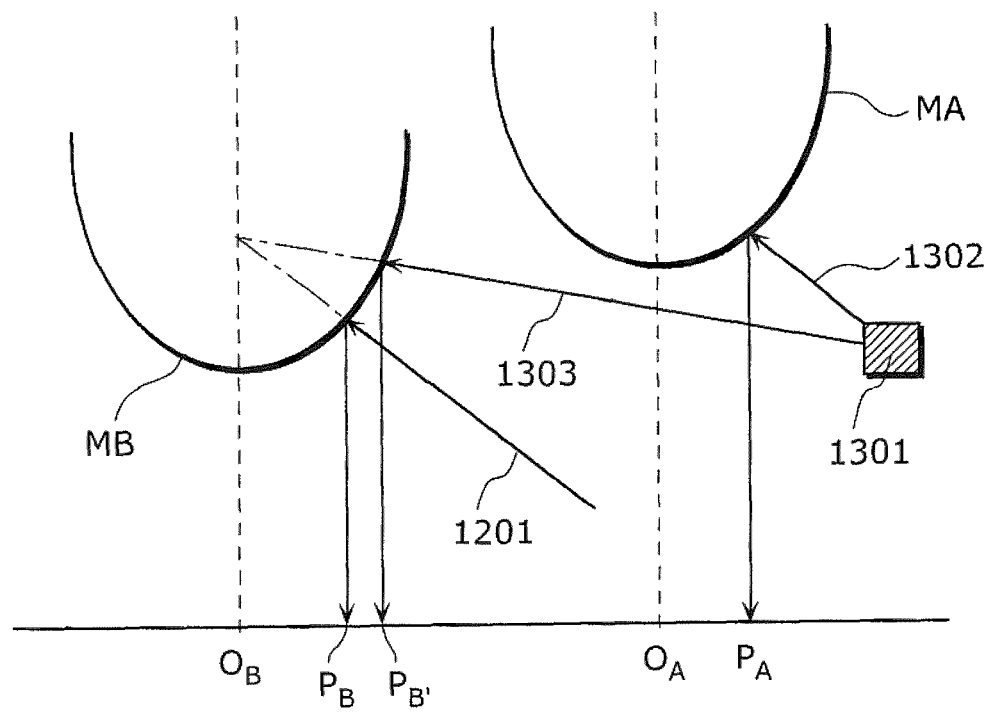
FIG. 14 is a diagram schematically showing a positional relationship between projection points when a light ray from a nearby object is reflected by the two parabolic mirrors.

Next, as shown in FIG. 14, it is assumed that there is an object 1301 at a nearby point. In addition, it is assumed that the object 1301 is located at a position such that the light ray 1302 from infinity is projected onto the point $P_A$. In this context, the image of the object 1301 formed by the parabolic mirror MB is an image formed when a light ray 1303, proceeding from the object 1301 toward the focal point of the parabolic mirror MB, is reflected by the parabolic mirror MB and is then projected onto the point $P_{B'}$. Accordingly, the pixel values at the points $P_A$ and $P_B$ are not equal, which proves that the images projected onto the points $P_A$ and $P_B$ are not formed of the light from infinity, that is, proves that the object 1301 is located close to the optical system. This technique allows obtaining the distance information indicating whether or not the object 1301 is close to a boundary assumed to be located in a predetermined distance. The distance determined to be the boundary is defined such that the distance between $P_B$ and $P_{B'}$ on the image is equivalent to exactly one pixel.

Note that the case of using the parabolic mirror is described here; however, even in the case of using a mirror having another shape, it is also possible to detect likewise whether or not the object 1301 is located nearby, provided that it is possible to previously obtain the positional relationship between positions onto which the light ray from infinity is projected.

For the parabolic mirrors MA and MB described above, it is possible to use the main mirror 11, and one or two sub mirrors 50.

In addition, in the case of using three or more mirrors, it is possible to use a technique of judging the above relationship for each set of mirrors sharing the same field of view among combinations of the mirrors, and performing majority decision or the like on the results, so as to obtain distance information more reliably. For example, it is possible to reliably calculate distance information, using the three mirrors, that is, the main mirror 11 and the two sub mirrors 50 of the optical system 200.

As described above, according to the third embodiment of the present invention, it is possible, in addition to the advantageous effect described in the first embodiment, to calculate the distance information from the reflection images of the main mirror 11 and the sub mirrors 50.

Thus far, embodiments of the present invention have been described, but the present invention is not limited to the description above but can also be performed in a variety of forms for achieving the object of the present invention and purposes associated with the object, and may also be performed as below, for example.

For example, in the first to third embodiments, the quadric surface represented by Expression (1) has been described as an equation representing a mirror shape, but what is known as an aspheric shape defined by Expression (4) below may also be used.

[Math. 4]

$$z = \frac{cr^2}{1 + \sqrt{1-(1+k)(cr)^2}} + \alpha r^2 + \beta r^4 + \gamma r^6 + \delta r^8 + \ldots \qquad \text{Expression (4)}$$

Note that each of α, β, γ, δ ... is an aspheric factor.

In addition, in the second embodiment, another configuration of the lens group 13 may be such that the position of the front principal point does not change by zooming, instead of using the movement portion 21. By using the lens group thus configured, it is also possible to produce an advantageous effect of fixing the position of the front principal point of the lens group 13. Patent Literature 3 discloses a technique of varying the focus, with the position of the front principal point held at a point in a zoom lens. Use of this technique allows realizing a configuration which does not change the position of the front principal point by zooming.

[PTL 3] Japanese Examined Patent Application Publication No. 61-10047

Figure 15:
FIG. 15 is a diagram showing an example of a data table indicating a relationship between a zoom factor and a lens barrel.

In addition, in the second embodiment, the configuration may also be such that: instead of using a cam for the movement portion 21, an external barrel is provided around the lens barrel 14, and the lens barrel 14 is held slidable forward and backward; a ROM in the control unit 30 previously holds an amount of sliding corresponding to the zoom factor; and the amount of movement is determined with reference to the recorded amount of sliding. FIG. 15 is a diagram showing an example of a data table recorded in the ROM in the control unit 30. This data table records the zoom factor and the amount of movement of the lens barrel 14 in association with each other, and indicates, for example, that the amount of movement of the lens barrel 14 is 2 mm at zoom factor 1.2.

In addition, in the third embodiment, the main mirror 11 and the sub mirrors 50 are separately formed, but these mirrors may also be formed into a single configuration in advance. Forming these mirrors into a single configuration causes no misalignment when attaching the sub mirrors 50, thus reducing errors in distance information to be obtained.

In addition, all the first to third embodiments have a configuration that includes an optical system only, but these embodiments are also applicable as an imaging device which incorporates the optical system described in such embodiments.

It should be considered that the embodiments described above are not limitative but illustrative in every aspect. The scope of the present invention is presented not by the description above but by the claims, and is intended to include all the changes and modifications without departing from the meaning and scope equivalent to the claims.

[Industrial Applicability]

The present invention is applicable as an optical system which allows a wider field with suppressed size, and also allows capturing an image which retains a feature of single viewpoint equally in zooming and in pan-tilt operation. The present invention is particularly applicable when it is intended to keep an entire device compact.

| [Reference Signs List] | |
|---|---|
| 10, 100, 200 | Optical system |
| 11 | Main mirror |
| 12 | Second-reflection mirror |
| 13 | Lens group |
| 14 | Lens barrel |
| 15 | Base |
| 16 | Optical axis of a lens group |
| 17 | Rotational axis of the second-reflection mirror |
| 20 | Holding portion |
| 21 | Movement portion |
| 22 | Two-axis gimbal |
| 30 | Control unit |
| 50 | Sub mirror |

The invention claimed is:

1. An optical system comprising:
   a main mirror having a shape of a portion of a convex paraboloid which includes an opening in a center and is rotationally symmetric;
   a second-reflection mirror which further reflects light reflected by said main mirror, said second-reflection mirror having a shape of a portion of a concave paraboloid which is rotationally symmetric;
   at least one lens which forms an image of the light reflected by said second-reflection mirror;
   a lens barrel holding said at least one lens; and
   at least one sub mirror each being formed separately from said main mirror and having a shape of a convex paraboloid which is rotationally symmetric,
   wherein a position of a front principal point of said at least one lens coincides with a focal position of said second-reflection mirror,
   wherein an optical axis of said at least one lens is tilted with respect to a rotational axis of each of the convex paraboloid and the concave paraboloid, and
   wherein said at least one sub mirror is positioned such that the light reflected by said at least one sub mirror is further reflected by said second-reflection mirror and is formed into an image through said at least one lens.

2. The optical system according to claim 1,
   wherein said at least one lens is a lens group including at least two lenses, and
   wherein said lens group is included in a zoom lens.

3. The optical system according to claim 2, further comprising
   a movement portion having a structure with which said lens barrel is moved forward and backward along an optical axis of said lens group,
   wherein said movement portion has a structure with which said lens barrel is moved to a point at which a variation in the position of the front principal point is offset, and at which the position of the front principal point of said lens group coincides with the focal position of said second-reflection mirror, the variation being caused by change in a zoom factor of said lens group.

4. The optical system according to claim 2,
   wherein said lens group has a configuration in which the front principal point is not moved by change in a zoom factor.

5. The optical system according to claim 2, further comprising
   a gimbal mechanism holding said lens barrel and allowing the optical axis of said lens group to rotate in a biaxial direction,
   wherein a rotational axis in each direction of said gimbal mechanism passes through the focal position of said second-reflection mirror.

6. The optical system according to claim 1,
   wherein two sub mirrors are provided, said two sub mirrors being said at least one sub mirror.

7. The optical system according to claim 6,
   wherein $30° \leq \theta \leq 90°$ where $\theta$ is an opening angle between a central axis of each of said two sub mirrors and a central axis of said main mirror.

8. An imaging device including the optical system according to claim 1.

* * * * *